United States Patent [19]
Boudot et al.

[11] Patent Number: 4,822,758
[45] Date of Patent: Apr. 18, 1989

[54] MEDIUM REFRACTIVE INDEX GLASS SUITABLE FOR OPHTHALMIC APPLICATIONS

[75] Inventors: Jean E. Boudot; Jean-Pierre Mazeau, both of Avon, France

[73] Assignee: Corning Glass Works, Corning, N.Y.

[21] Appl. No.: 210,427

[22] Filed: Jun. 23, 1988

[30] Foreign Application Priority Data

Nov. 4, 1987 [FR] France ............................. 87 15278

[51] Int. Cl.$^4$ ............... C03C 3/089; C03C 3/093; C03C 4/00
[52] U.S. Cl. ............................... 501/65; 501/67; 501/903
[58] Field of Search ..................... 501/65, 67, 903

[56] References Cited

U.S. PATENT DOCUMENTS

| | | | |
|---|---|---|---|
| 2,523,265 | 9/1954 | Armistead | 501/903 |
| 2,699,399 | 1/1955 | Armistead | 501/903 |
| 2,901,365 | 8/1959 | Seymour et al. | 501/65 |
| 4,438,211 | 3/1984 | Mennemann et al. | 501/903 |
| 4,444,893 | 4/1984 | Mader | 501/903 |
| 4,540,672 | 9/1985 | Boudot et al. | 501/903 |
| 4,562,161 | 12/1985 | Mennemann et al. | 501/903 |

*Primary Examiner*—Mark L. Bell
*Attorney, Agent, or Firm*—Clinton S. Janes, Jr.

[57] ABSTRACT

This invention is related to glasses particularly useful in the fabrication of multifocal lenses for ophthalmic applications. The inventive glasses exhibit a refractive index between 1.599–1.602, an Abbe number between 40.5–41.5, a density between 2.64–2.66 g/cm$^3$, a transmission of visible radiation at 400 nm through a thickness of 10 mm greater than 83%, a softening point between 670°–680° C., a birefringence upon sealing, measured as described, between −150 and +150 nm/cm, and consist essentially, expressed in terms of weight percent on the oxide basis, of:

| | | | |
|---|---|---|---|
| SiO$_2$ | 52–57 | K$_2$O | 11.0–16.0 |
| B$_2$O$_3$ | 2.5–7.0 | CaO | 2–3.5 |
| Al$_2$O$_3$ | 0–1 | ZrO$_2$ | 1–1.5 |
| Li$_2$O | 0.3–0.8 | TiO$_2$ | 15.0–16.2 |
| Na$_2$O | 5.4–8.2 | As$_2$O$_3$ | 0.1–0.4 | with the condition that M=69–72 where $$M = \frac{1}{100} [760x\% \text{ Li}_2\text{O} + 270x\% \text{ Na}_2\text{O} + 170x\% \text{ K}_2\text{O} + 185x\% \text{ CaO} + 130x\% \text{ TiO}_2].$$

3 Claims, No Drawings

MEDIUM REFRACTIVE INDEX GLASS SUITABLE FOR OPHTHALMIC APPLICATIONS

BACKGROUND OF THE INVENTION

The present invention is concerned with glasses for ophthalmic applications. More particularly, this invention is concerned with glasses which permit the fabrication of multifocal lenses by one of the processes currently utilized; that is to say, by soldering or "fusion" of one or more glasses to the principal glass, said "segment glasses" having a higher refractive index. This invention is related to the principal glass.

This invention is designed to produce glasses having a refractive index ($n_d$) between about 1.599–1.602, an Abbe number ($\nu_d$) of 40.5–41.5, a softening point or Littleton temperature of 670°–680° C., very low birefringence when sealed to existing segment glasses for "white" glasses with a refractive index of 1.523, a density of 2.64–2.66 g/cm³, very good transmission in the visible region of the radiation spectrum (transmission at a wavelength of 400 nm for a thickness of 10 mm greater than 83%), an absence of undesirable yellow coloration, excellent chemical durability and stability with respect to devitrification, and a viscosity at the highest temperature of devitrification (or "liquidus") equal to or greater than 3000 poises so as to enable products to be produced using a continuous melting unit and formed using an automatic pressing process, which is indispensable for obtaining a cost of production that is low and compatible with the application.

SUMMARY OF THE INVENTION

Glasses having a refractive index on the order of 1.600 have recently been developed for their use in low and average corrections, that is to say, in the region of lenses with a power of about +6 to −6 diopters. With respect to the current "white" glasses with a refractive index of 1.523, the present inventive glasses permit thinner lenses to be obtained and, in certain cases, appreciably lighter lenses (especially the highest corrections). For that it is indispensable that the density of the glass not be too high; it is especially preferable that it not be greater than 2.66 g/cm³. The increase in the index of refraction generally leads to a decrease in Abbe number or constringence (that is to say, an increase in the dispersion of the glass). If the dispersion is very high, the chromatic aberration then becomes significant and brings about the appearance of a colored fringe on the border of the lens which bothers the wearer of the lens. In order to alleviate this defect, the glass should have a constringence as high as possible.

Thinness and lightness considerably improve the aesthetic appearance of the lenses and offer the wearer of eyeglasses better comfort. Because of the interest that has developed for this type of glass, it is necessary to be able to offer a series of products covering a range of applications as large as possible. One of these applications is the "double" correction (far and near vision) required by certain individuals, which can be effected through the help of lenses called "progressives" or through the help of fused bifocal lenses. The glasses of this invention apply more particularly to this second type of application. Obviously, they can also serve in the fabrication of all types of lenses, single vision, "progressives," and aspherics obtained by current polishing techniques.

The glasses of the present invention exhibit another characteristic. That is, they can be fused to existing segment glasses and readily used with "white" glasses with a refractive index of 1.523. The advantages are evident as much as from a technical point of view as an economic point of view. The characteristics of two commercially marketed segment glasses which can be used with the glasses of the present invention are listed below:

|  | Glass A | Glass B |
|---|---|---|
| Refractive index ($n_d$) | 1.681 | 1.750 |
| Constringence ($\nu_d$) | 38.3 | 31.4 |
| Density (g/cm³) | 3.52 | 4.25 |
| Softening point ($T_L$) °C. | 665 | 660 |
| Coefficient of thermal expansion (25°–300° C.) $\times 10^{-7}$/°C. | 90 | 89 |

The operation of fusing the segment glass to the principal glass is conducted at a temperature near the softening point of the latter and slightly higher than the softening point of the segment glass. Keeping in mind the softening points of the segment glasses given above, the principal glass should have a $T_L$ of at least 670° C.

It is generally acknowledged that the seal between the two glasses should exhibit a birefringence between about −150 and +150 nm/cm and preferably between −50 and +50 nm/cm which requires quite close coefficients of thermal expansion. The measurement of the birefringence is more representative of the seal than that of the linear coefficient of thermal expansion. So that is the criterion that was observed in characterizing the principal glass. It should be noted, however, that the coefficient of thermal expansion of the inventive glasses between 25°–300° C. is between $92–100\times10^{-7}$/°C.

Satisfying the criteria of the softening point temperature and birefringence of the seal, accompanied with other required conditions, was one of the critical difficulties to be resolved.

According to the invention it has been found that glasses having the above-mentioned characteristics should have a composition located within the following restricted limits (expressed in terms of weight percent on the oxide basis as calculated from the batch):

| | | | |
|---|---|---|---|
| $SiO_2$ | 52–57 | $K_2O$ | 11.0–16.0 |
| $B_2O_3$ | 2.5–7.0 | CaO | 2–3.5 |
| $Al_2O_3$ | 0–1 | $ZrO_2$ | 1–1.5 |
| $Li_2O$ | 0.3–0.8 | $TiO_2$ | 15.0–16.2 |
| $Na_2O$ | 5.4–8.2 | $As_2O_3$ | 0.1–0.4 | with the condition that M=69–72 where $$M = \frac{1}{100} [760x\% \ Li_2O + 270x\% \ Na_2O +$$

$$170x\% \ K_2O + 185x\% \ CaO + 130x\% \ TiO_2].$$

M is defined as the sum of the percentages of the principal modifying oxides weighted by their contribution to the birefringence of the seal; this contribution having been determined experimentally. Thus, if M is less than about 69, the glass is not sufficiently "expansible" (lack of modifiers) and the birefringence of the seal will be positive and greater than about 150. The situation is reversed in the case where M>72.

The amount of $SiO_2$ will comprise between 52–57% by weight. This range is imposed by the choice of the other constituents of the glass whose contents limits are given below.

$B_2O_3$ is an important constituent of the glass composition. Its principal advantages are a small contribution to the density of the glass associated with a reduction in the viscosity when it is added in substitution for $SiO_2$. The influence of $B_2O_3$ on the viscosity and, consequently, on the ease of production of the glass, also contributes to obtaining a glass exhibiting very little coloration. So the glass will contain at least 2.5% by weight. Beyond 7% $B_2O_3$, however, the amount of $SiO_2$ should be decreased in order to maintain the birefringence, which leads to an undesirable reduction in the softening point of the glass.

$Al_2O_3$ increases the viscosity of the glass and improves its chemical durability, but, on the other hand, it rapidly makes worse the devitrification tendency of the glass. Substituted for $SiO_2$, it slightly decreases the $T_L$. So, its content will not exceed about 1% by weight.

$Li_2O$ substituted for $SiO_2$ or $B_2O_3$ very strongly reduces the $T_L$ and raises the coefficient of thermal expansion, but it contributes to raising the refractive index without unfavorably altering the density of the glass. Its content will comprise between 0.3–0.8% by weight.

For the other alkali metals used in the glass composition, the replacement of $Na_2O$ with $K_2O$ is favorable in raising the $T_L$, but unfavorable in reducing the refractive index. The birefringence of the glass is adjusted by substituting the alkali metal oxides $Na_2O$ and $K_2O$ for glass formers $SiO_2$ and $B_2O_3$. For a negative birefringence (coefficient of thermal expansion too high) $SiO_2$ will be substituted for $Na_2O$, which is favorable in raising the $T_L$. For a positive birefringence $K_2O$ will be substituted for $B_2O_3$, the $T_L$ will remain essentially unchanged. For these various reasons the $Na_2O$ content will comprise about 5.4–8.2% by weight and that of $K_2O$ between 11.0–16.0% by weight.

$TiO_2$ is the constituent which offers the best density-refractive index compromise. Used in a great amount, however, it decreases the transmission in the visible, facilitates devitrification, increases the density, and rapidly reduces the Abbe number. So its content will comprise between 15–16.2% by weight.

$ZrO_2$ raises the refractive index and the density of the glass, but reduces the Abbe number less rapidly than $TiO_2$. This oxide improves the durability against alkaline agents and to satisfy that effect its content should be at least 1%. Nevertheless, it should not exceed 1.5% in order not to raise the density of the glass excessively.

CaO is introduced in order to limit the content of $TiO_2$ and, consequently, to permit a very high Abbe number to be obtained. At least 2% must be present. Beyond 3.5%, however, the tendency toward devitrification significantly increases.

PRIOR ART

U.S. Pat. No. 4,540,672 is directed to glasses suitable for optical and ophthalmic applications which exhibit densities less than 2.65 g/cm³, refractive indices between 1.595–1.607, Abbe numbers between 40–47, and which consist essentially, in weight percent, of:

| $SiO_2$ | 45–55 | MgO and/or BaO and/or SrO and/or $La_2O_3$ | 0–6 |
|---|---|---|---|
| $B_2O_3$ | 5–13 | CaO | 0–12 |
| $Al_2O_3$ | 0–5 | ZnO | 0–8 |
| $Li_2O$ | 1–7.5 | $ZrO_2$ | 0–7 |
| $Na_2O$ | 1–9 | $TiO_2$ | 9.5–17.5 |
| $K_2O$ | >10–24 | $As_2O_3$ and/or $Sb_2O_3$ | 0–1 | wherein the above composition ranges are subject to the condition:

$$13.5 \geqq TiO_2+ZrO_2+La_2O_3+MgO+CaO+BaO+SrO+ZnO \leqq 23.5.$$

Whereas those broad ranges overlap the composition intervals of the present invention, with the exception of the $Li_2O$ content, the physical properties exhibited by the glasses vary relatively widely and there is no requirement regarding the capability of the glasses to be sealed to existing segment glasses. Specifically, there was no requirement that the birefringence demonstrated at the seal be between ±150 nm/cm and, preferably, between ±50 nm/cm. To achieve that characteristic, the glasses of the present invention not only must have compositions within the very strictly delimited intervals, but also must comply with a M value between 69–72. No reference is made to a M value in the patent.

U.S. Pat. Nos. 2,523,265, 2,699,399, 2,901,365, and 4,438,211, Japanese Patent Publication 54–105,119, and Great Britain Patent Application No. 2,115,403 are also generally related to the present invention, but are not believed to be as relevant as U.S. Pat. No. 4,540,672 supra.

DESCRIPTION OF PREFERRED EMBODIMENTS

The invention is further illustrated through the non-limiting examples of Table I. The preferred example is No. 1. All the proportions of the components are given in weight percent on the oxide basis as calculated from the batch. Table 2 provides several examples of glasses which have compositions outside of the invention (the M parameter is outside the required limits). It can also be stated that, when M>72, the $T_L$ is generally lower than 670° C.

EXAMPLES OF A GLASS MELT

The glasses are prepared from customary batch materials (oxides, carbonates, hydrates, etc.). The batch materials chosen will preferably contain a minimum amount of $Fe_2O_3$ in order to obtain a glass as "white" as possible.

After weighing, the batch materials are mixed together in accordance with current techniques. The mixture is then charged into a platinum crucible at a temperature of about 1250° C. When it is completely melted, the temperature of the melt is taken to about 1320°–1400° C. and maintained there for 1–4 hours for homogenization and fining of the melt. The glass melt is then cooled to a temperature at which the viscosity thereof is appropriate for forming and poured into steel molds. The glass is then annealed at 500° C. and cooled slowly at a rate of 60° C./hour to ambient temperature.

The refractive index ($n_d$), the constringence ($\nu_d$), the density (Den), the softening point in °C. ($T_L$) the linear coefficient of thermal expansion over the range of 25°–300° C. in $10^{-7}$ °$C^{-1}$ (Exp), the transmission to visible radiation in % (Tran), the liquidus viscosity in poises (Vis), and the liquidus temperature in °C. (Liq) were measured utilizing conventional methods. In order to determine the birefringence (Bir), a seal was made with segment glass A, mentioned above, at 670° C. for 30 minutes. The two contacting glass surfaces had previously been polished. After sealing, a 10 mm thick sample was cut perpendicularly to the plane of the join which is afterwards polished, and the birefringence then measured in the principal glass with the aid of a "Babinet Compensator"-type of apparatus. The birefringence is expressed in nm/cm.

The chemical resistance [acid durability (Dur)] is determined through a test which consists of measuring the loss in weight of a polished sample immersed for three hours in a boiling aqueous solution containing 20% by volume HCl. The loss in weight is expressed in terms of $mmg/dm^2$.

TABLE I

|  | 1 | 2 | 3 | 4 | 5 | 6 | 7 | 8 | 9 |
|---|---|---|---|---|---|---|---|---|---|
| $SiO_2$ | 53.95 | 54.2 | 54.2 | 52.75 | 54.45 | 53.05 | 53.95 | 52.95 | 56.4 |
| $B_2O_3$ | 5.05 | 4.47 | 4.9 | 6.55 | 3.8 | 6.05 | 4.85 | 5.05 | 2.95 |
| $Al_2O_3$ | 0.5 | 0.5 | 0.5 | 0.5 | 0.5 | 0.5 | 0.5 | 0.5 | 0.5 |
| $Li_2O$ | 0.7 | 0.7 | 0.5 | 0.5 | 0.6 | 0.5 | 0.5 | 0.5 | 0.5 |
| $Na_2O$ | 5.9 | 5.74 | 7.95 | 5.9 | 5.95 | 6.1 | 6.3 | 5.9 | 8.2 |
| $K_2O$ | 13.85 | 14.09 | 12.2 | 14.05 | 14.4 | 14.05 | 13.85 | 15.85 | 11.4 |
| CaO | 3.15 | 3.2 | 3.3 | 3.15 | 3.15 | 3.05 | 3.15 | 2.0 | 2.35 |
| $ZrO_2$ | 1.3 | 1.32 | 1.0 | 1.0 | 1.0 | 1.0 | 1.3 | 1.3 | 1.3 |
| $TiO_2$ | 15.3 | 15.48 | 15.15 | 15.3 | 15.85 | 15.4 | 15.3 | 15.65 | 16.1 |
| $As_2O_3$ | 0.3 | 0.3 | 0.3 | 0.3 | 0.3 | 0.3 | 0.3 | 0.3 | 0.3 |
| M | 70.5 | 70.8 | 71.8 | 69.3 | 71.5 | 69.8 | 70.1 | 70.7 | 70.6 |
| $n_d$ | 1.6005 | 1.6004 | 1.5995 | 1.6012 | 1.6014 | 1.6008 | 1.6000 | 1.6000 | 1.5997 |
| $\nu_d$ | 41.1 | 41.2 | 41.4 | 41.1 | 40.8 | 40.8 | 41.2 | 40.8 | 40.5 |
| Den | 2.65 | 2.65 | 2.66 | 2.65 | 2.65 | 2.65 | 2.65 | 2.65 | 2.65 |
| $T_L$ | 671 | 674 | 670 | 671 | 679 | 672 | 675 | 673 | 680 |
| Exp | 96.5 | — | 97.3 | 93.1 | — | 94.8 | — | — | — |
| Bir | 0 | −40 | −90 | +40 | +75 | +135 | +140 | −25 | 0 |
| Tran | 84 | 86.2 | — | 84.1 | 83 | 83.7 | — | — | 84.2 |
| Liq | ≈920 | — | ≈923 | ≈912 | ≈940 | ≈911 | ≈910 | — | — |
| Vis | ≈3600 | — | — | — | ≈3500 | — | — | — | — |
| Dur | 3.5 | — | — | 10.7 | — | — | — | — | — |

TABLE II

|  | 10 | 11 | 12 | 13 | 14 |
|---|---|---|---|---|---|
| $SiO_2$ | 54.2 | 53.25 | 52.95 | 54.7 | 54.95 |
| $B_2O_3$ | 4.9 | 4.35 | 5.05 | 5.9 | 5.05 |
| $Al_2O_3$ | 0.5 | 0.5 | 0.5 | 0.5 | 0.5 |
| $Li_2O$ | 1.0 | 0.7 | 0.7 | 0.7 | 0.7 |
| $Na_2O$ | 7.45 | 5.95 | 6.9 | 5.95 | 4.9 |
| $K_2O$ | 12.2 | 14.6 | 13.85 | 12.2 | 13.85 |
| CaO | 3.1 | 3.8 | 3.15 | 3.8 | 3.15 |
| $ZrO_2$ | 1.0 | 1.3 | 1.3 | 1.3 | 1.3 |
| $TiO_2$ | 15.35 | 15.25 | 15.3 | 14.65 | 15.3 |
| $As_2O_3$ | 0.3 | 0.3 | 0.3 | 0.3 | 0.3 |
| M | 74.15 | 73.06 | 73.21 | 68.20 | 67.81 |
| $n_d$ | 1.6012 | 1.6002 | 1.6011 | 1.6007 | 1.6005 |
| $\nu_d$ | 41.2 | 41.6 | 41.3 | 41.4 | 41.0 |
| Den | 2.66 | 2.66 | 2.66 | 2.65 | 2.65 |
| $T_L$ | 655 | 665 | 663 | 677 | 678 |
| Exp | 97.1 | 99.5 | — | 92.7 | — |
| Bir | −360 | −300 | −280 | +310 | +385 |
| Liq | ≈923 | ≈930 | ≈912 | ≈960 | — |

The criticality of maintaining the value of M between 69-72 in order to insure the preparation of seals exhibiting low birefringence is immediately apparent from an examination of Table II. Examples 10, 11, 13, and 14 are compositions just slightly outside of those prescribed in the products of the present invention, and Example 12 comprises a composition wherein each individual component is within the ranges of the present invention glasses. In each Example, however, the M value is outside of the composition interval found necessary to yield a seal demonstrating low birefringence. Consequently, Examples 10-14 would not be suitable glasses in the present invention. It might be observed that the composition of Example 10 is essentially within the composition ranges of U.S. Pat. No. 4,450,672, supra.

We claim:

1. A glass having a refractive index between 1.599-1.602, an Abbe number between 40.5-41.5, a density between 2.64-2.66 g/cm³, a transmission of visible radiatin at 400 nm through a thickness of 10 mm greater than 83%, a softening point between 670°-680° C., and a birefringence, measured as described, between −150 and +150 nm/cm, consisting essentially, expressed in terms of weight percent on the oxide basis, of:

| $SiO_2$ | 52-57 | $K_2O$ | 11.0-16.0 |
|---|---|---|---|
| $B_2O_3$ | 2.5-7.0 | CaO | 2-3.5 |
| $Al_2O_3$ | 0-1 | $ZrO_2$ | 1-1.5 |
| $Li_2O$ | 0.3-0.8 | $TiO_2$ | 15.0-16.2 |
| $Na_2O$ | 5.4-8.2 | $As_2O_3$ | 0.1-0.4 | with the condition that M=69-72 where $$M = \frac{1}{100} [760x\% \, Li_2O + 270x\% \, Na_2O + 170x\% \, K_2O + 185x\% \, CaO + 130x\% \, TiO_2].$$

2. A glass according to claim 1 wherein the viscosity thereof at the liquidus temperature is equal to or greater than 300 poises.

3. A glass according to claim 1 wherein the birefringence is between −50 and +50.

* * * * *